(12) United States Patent
Bi et al.

(10) Patent No.: US 7,792,048 B2
(45) Date of Patent: Sep. 7, 2010

(54) OUTER LOOP POWER CONTROL IN A COMMUNICATION SYSTEM

(75) Inventors: Qi Bi, Morris Plains, NJ (US); Dongzhe Cui, Parsippany, NJ (US); Qinqing Zhang, Morganville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1648 days.

(21) Appl. No.: 10/954,556

(22) Filed: Sep. 30, 2004

(65) Prior Publication Data

US 2006/0067276 A1 Mar. 30, 2006

(51) Int. Cl.
H04L 12/26 (2006.01)

(52) U.S. Cl. .................. 370/252; 370/342; 455/522

(58) Field of Classification Search ............... 370/252, 370/318, 331, 335, 338, 342, 253; 455/522, 455/226.2, 226.3
See application file for complete search history.

(56) References Cited

U.S. PATENT DOCUMENTS

| | | | | |
|---|---|---|---|---|
| 5,867,483 | A * | 2/1999 | Ennis et al. ................ 370/252 |
| 6,587,447 | B1 * | 7/2003 | Wang et al. ............... 370/335 |
| 6,587,696 | B1 * | 7/2003 | Ma et al. .................. 455/522 |
| 6,654,613 | B1 | 11/2003 | Maeng et al. |
| 6,748,234 | B1 * | 6/2004 | Agrawal et al. ............ 455/522 |
| 7,035,231 | B2 * | 4/2006 | Yu et al. .................... 370/318 |
| 7,110,785 | B1 * | 9/2006 | Paranchych et al. ......... 370/333 |
| 2002/0119757 | A1 * | 8/2002 | Hamabe ..................... 455/69 |
| 2002/0176362 | A1 * | 11/2002 | Yun et al. .................. 370/236 |
| 2003/0142632 | A1 * | 7/2003 | Lin et al. ................... 370/252 |
| 2004/0137930 | A1 | 7/2004 | Kim et al. |
| 2007/0173274 | A1 * | 7/2007 | Lim .......................... 455/522 |

FOREIGN PATENT DOCUMENTS

WO     WO 03/103324 A1     12/2003

OTHER PUBLICATIONS

European Search Report for Application No. EP 05 25 5877, mailed Dec. 14, 2005.

* cited by examiner

*Primary Examiner*—Ricky Ngo
*Assistant Examiner*—Gary Mui
(74) *Attorney, Agent, or Firm*—Carlson, Gaskey & Olds, P.C.

(57) ABSTRACT

Outer loop power control for a traffic channel includes using at least one output from another channel to determine an appropriate control threshold such as a signal-to-noise ratio when selected channel conditions exist. One example traffic channel condition comprises having insufficient data transmission to provide a direct measurement of packet error rate. Another example traffic channel condition used to determine when to use the other channel output is a transmission mode on the traffic channel. An example output used for setting the control threshold is a chip energy to noise ratio of a pilot channel associated with the traffic channel.

19 Claims, 3 Drawing Sheets

OUTER LOOP POWER CONTROL IN A COMMUNICATION SYSTEM

FIELD OF THE INVENTION

This invention generally relates to telecommunications.

DESCRIPTION OF THE RELATED ART

Communication systems may be based upon hardwired connections, wireless signal transmissions or a combination of the two. Some systems are capable of handling voice communications. Some are capable of handling data communications. Some are capable of handling more than one type of communication (i.e., voice and data).

In data communication systems, information bits are typically grouped into a frame or packet format and transmitted to a receiver. The received packets may be lost or include errors because of a noisy channel for transmitting the data, for example. The packet error rate (PER) is the percentage of received packets that include an error.

Known systems determine a PER directly by counting the number of lost or erroneous packets during a time interval. In many situations, however, it is not possible to adequately determine the PER using direct counting techniques. In many data transmission arrangements, the transmission is not continuous over the channel. Data transmissions tend to be bursty, for example. During silent periods where there are no received data packets, there is nothing to be counted and no basis for determining the PER.

Another situation where directly counting to determine the PER does not necessarily provide reliable results is when the actual PER is very small. For example, the PER may be on the order of $10^{-4}$ or $10^{-5}$. Within a limited time interval, the number of received packets is not large enough to provide sufficient information for accurately determining the PER.

The PER is an important metric indicating the channel quality and system performance. PER can be controlled by adjusting a signal-to-noise ratio (SIR), introducing redundancy or both to reduce the occurrence of packet errors. Known systems are designed to attempt to maintain PER below a selected target. There is a trade-off between service quality and signal transmit power that typically affects the selection of the PER target. Outer loop power control is used to select the appropriate threshold or SIR to strike an appropriate balance between service quality and transmit power.

Forward error correction (FEC) and automatic repeat request (ARQ) are traditional error protection schemes in communication systems. At a transmitter, an encoder adds redundancy to protect the information bit in the form of parity bits. At the receiver, a decoder explores the redundancy so that a certain number of errors can be corrected. A coded system can tolerate more channel errors per interface and, therefore, can afford to operate at a lower transmit power and transmit at a higher data rate. For ARQ, the transmitter sends a packet to the receiver. The receiver performs error detection upon receipt of the packet to determine whether the packet has errors. The receiver sends an acknowledgement back to the transmitter indicating whether the packet was successfully received. If the packet is not received correctly, the transmitter retransmits the same packet. Otherwise, the transmitter removes the packet from its buffer and processes the next packet.

There is also a combination of the FEC and ARQ techniques, which is known as the hybrid ARQ (HARQ) scheme. Two specific techniques are known within HARQ: Chase combining and incremental redundancy. An original data packet is coded with a low rate FEC code. The coded packet is then divided into multiple sub-packets. Each sub-packet is used as the unit for transmission. In Chase combining, each sub-packet is the same as the original coded packet. If the sub-packet is decoded with errors, the next sub-packet is transmitted. At the receiver, multiple received sub-packets are optimally combined and decoded. With incremental redundancy, each sub-packet is different and has redundancy information of the original packet. If the first sub-packet is decoded incorrectly, the next sub-packet is transmitted. At the receiver, multiple received sub-packets are concatenated together and form a coded word for decoding. Using more sub-packets in a transmission results in a longer coded word at the receiver with more redundancy information. Accordingly, each transmission in an incremental redundancy technique provides additional redundancy information for higher error correction capability.

In wireless communication systems, convolutional codes and turbo codes are typically used as the FEC codes.

PER in a coded system depends on the ratio of the bit energy to noise spectrum density (Eb/No), the FEC code rate, ARQ scheme and the packet size. A decoding error probability for convolutional codes and turbo codes is difficult to compute analytically. Instead of obtaining the precise error probability, a bound typically is derived to reflect a reasonable level of decoding performance. For purposes of discussion, the data transmission on the traffic channel occurs in one example using wireless communication. One example system that has this capability is the 1xEV-DV system, which is the third generation CDMA2000 standards defined by 3GPP2.

There are multiple channels configured on a reverse link in the 1xEV-DV system. The high speed data channel for transmitting user traffic is the reverse link packet data channel (R-PDCH). The transmission time unit on this channel is typically referred to as a slot and often has a 10 millisecond duration. An encoder packet coded with a FEC code is divided into sub-packets. Each sub-packet is scheduled and transmitted within a time slot. There are various different encoder packet sizes. Known Turbo code is used as the FEC code for PDCH. Known convolutional code is used for legacy 3G1x traffic channels, such as the fundamental channel (FCH) and supplemental channel (SCH). The transmission rate on R-PDCH typically varies from 6.4 KBPS up to 1.8 MBPS and is dynamically set according to the channel condition and the available data at the mobile station. The different transmission rate on the R-PDCH is the result of different encoder sizes and the modulation scheme.

In one example, hybrid ARQ is used on the R-PDCH to explore time diversity and error performance improvement.

The reserve link pilot channel (R-PICH) is used to continuously send the pilot sequence. The pilot sequence is a sequence of unmodulated, known signals such as a plurality of binary digits. In a CDMA spread spectrum system, the pilot signal is used to determine multi-path component characteristics and help coherent demodulation of the received signals. The transmit power on the pilot channel is used as a reference point for other channels, for example. The R-PDCH, for example, has a fixed offset over the transmit power of the pilot channel that is typically called T2P (traffic to pilot) ratio.

In a CDMA system, for example, it is desirable to keep the PER of the traffic channel below a certain target. In one example, 1% PER maintains a reasonable quality of user data service. Adjusting a traffic SIR maintains control of the PER. When the PER is too high, for example, the target SIR will be increased. When the PER is too low, for example, the target SIR will be decreased to reduce the interference generated by a particular mobile station. Adjusting the target SIR to maintain the PER below a target threshold is sometimes referred to as outer loop power control. Inner loop power control adjusts the transmit power of a mobile station according to the target SIR. The inner loop and outer loop power control are operated concurrently to achieve a good system performance. The power control portion 22 of a base station is responsible for the outer loop power control.

The PER value is one example parameter used for outer loop power control. Under some circumstances it is possible to achieve a direct measurement of the PER on the PDCH (i.e., the traffic channel). There are times, however, where no packets are available and the power control portion of a base station is not able to directly measure PER. Under such circumstances, the outer loop power control may be compromised.

An additional consideration is that the R-PDCH in 1xEV-DV has four different modes designed for different applications. For example, the boost mode is designed for delay-sensitive applications. In the boost mode, the packet is sent at a higher power than the power setting for the regular mode. This increases the success probability of a first transmission and reduces retransmission delay. As a result, the PER after HRAQ combining is usually very small in the boost mode. It can be less than 0.1%, for example. Under such circumstances it is difficult to directly calculate a PER even when there are received packets available.

This invention addresses the need for maintaining outer loop power control even when the traffic channel conditions are such that previously developed techniques are not capable of providing satisfactory or reliable results.

SUMMARY OF THE INVENTION

An example method of communicating includes determining an outer loop power control threshold for a traffic channel based on at least one selected output of at least one other channel when there is a first traffic channel condition.

In one example, the first traffic channel condition includes at least one of an amount of data transmission on the traffic channel being below a selected threshold or a transmission mode on the traffic channel being one other than a normal mode.

In one example, the other channel is a pilot channel associated with the traffic channel. At least one output from the pilot channel provides a basis for estimating a packet error rate for the traffic channel. The estimated packet error rate provides a basis for determining how to set the outer loop power control threshold.

One example includes using a selected output from the traffic channel when a second, different traffic channel condition exists. In one example, a packet error rate of the traffic channel is determined and used for setting the outer loop power control threshold. Determining whether the first or second condition of the traffic channel exists allows for selecting the appropriate basis for setting the threshold.

The various features and advantages of this invention will become apparent to those skilled in the art from the following detailed description. The drawings that accompany the detailed description can be briefly described as follows.

DETAILED DESCRIPTION

Figure 1:
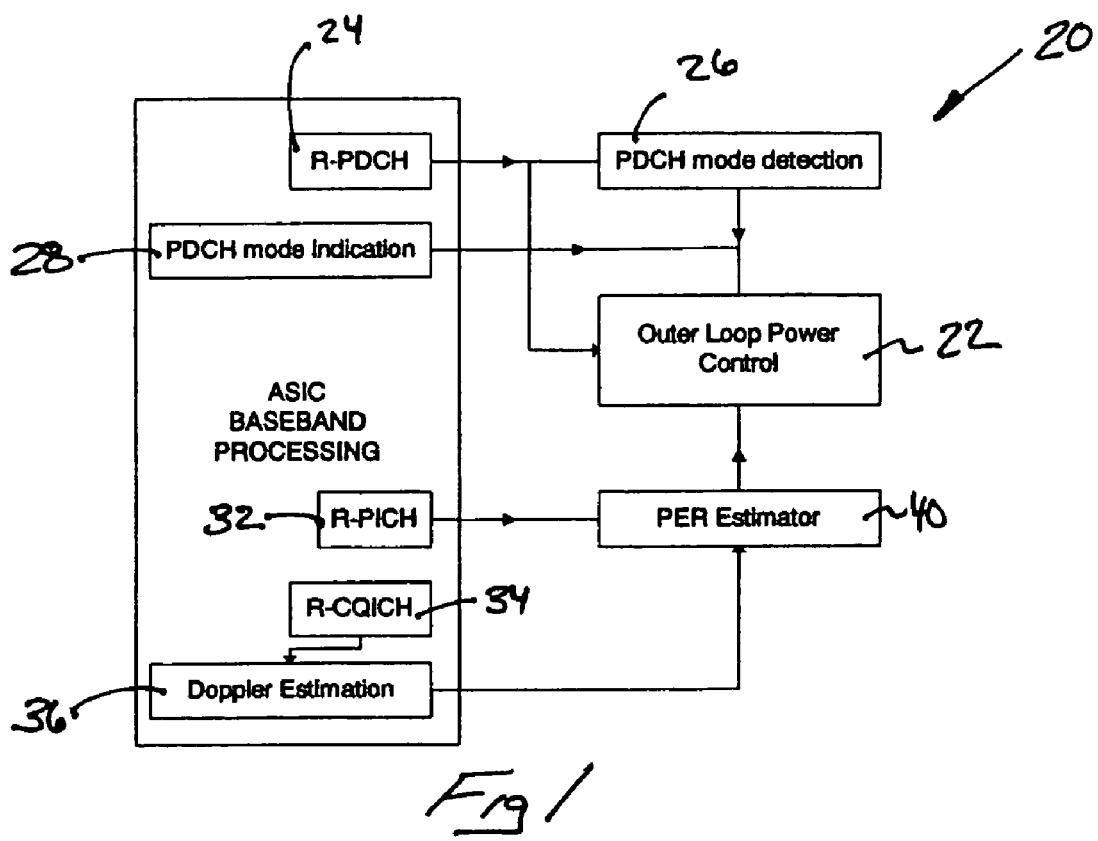
FIG. 1 schematically illustrates selected portions useful for outer loop power control in an example communication system.

FIG. 1 schematically shows selected portions of a communication system 20. In this example, an outer loop power control portion 22, which is part of a radio network controller used for wireless data communications, sets a threshold to achieve a target packet error rate (PER) on a traffic channel. One example threshold comprises a signal-to-noise ratio (SIR). A mobile station compares a signal-to-noise ratio to the threshold using known techniques and responsively adjusts a transmit power in a known manner. The illustrated example includes a unique method of setting the threshold.

A receiver portion 24 R-PDCH receives data packets on a traffic channel in a known manner. The receiver portion 24 processes the received packets in a known manner including detecting whether any of the packets includes errors. Error event information is provided to the power control portion 22.

The illustrated example includes two traffic channel mode detector portions 26 and 28. Either is capable of providing information to the power control portion 22 regarding a transmission mode on the traffic channel PDCH. Example transmission modes include a normal mode and a boost mode, each of which has a different average number of transmissions for a packet. The mode detector portion 28 in this example is part of an ASIC that is designed for baseband processing and decodes the data on the traffic channel PDCH to determine the transmission mode in a known manner. The schematically illustrated detector portion 26 uses an arrival rate of data packets to determine the transmission mode.

In one example, the detector portion 26 obtains the time stamp of each received packet and determines the time between arrival of sequentially received packets (i.e., an inter-arrival time). The detector portion 26 uses determined inter-arrival times to estimate an average number of transmissions of each packet. When the number of transmissions per packet is close to approximately one, the detector portion 26 determines that the traffic channel transmission mode is most likely the so-called boost mode. This follows from the use of a higher transmit power in a boost mode that increases the likelihood that a packet is successfully received on the first transmission. There are less repeat transmissions of a packet on average in a boost mode compared to a normal mode where less transmit power is used. If the average number of transmissions per packet is close to a maximum possible number, the data flow on the traffic channel PDCH is most likely in a normal or regular mode.

The illustrated example also has a receiver portion 32 R-PICH that receives a reverse link pilot channel PICH transmission. The receiver portion 32 detects and processes the pilot symbols in a known manner. At least one selected output of the pilot channel PICH is identified at the receiver portion 32. In one example, a ratio of energy-per-chip to a noise spectrum density of the pilot channel is the selected output and used for determining an estimated packet error rate of the traffic channel PDCH as described below.

Information regarding a mobile station is determined using a channel quality indicator channel receiver portion 32 R-CQICH and a Doppler estimation portion 34. In one example, the CQI information is utilized in a known manner to estimate the Doppler frequency of the fading process, which provides an indication of a speed of movement of the mobile station.

An estimator portion 40 determines an estimated PER that is provided to the power control portion 22. In this example, the estimated PER is based upon at least the selected output of the pilot channel PICH and the estimated Doppler frequency from the estimation portion 36. Using the pilot channel PICH output to estimate the PER of the traffic channel PDCH used for data transmission enables the power control portion 22 to set an appropriate outer loop power control threshold even under circumstances when there is insufficient data transmission on the traffic channel PDCH to enable direct measurement of the traffic channel PER.

Figure 2:
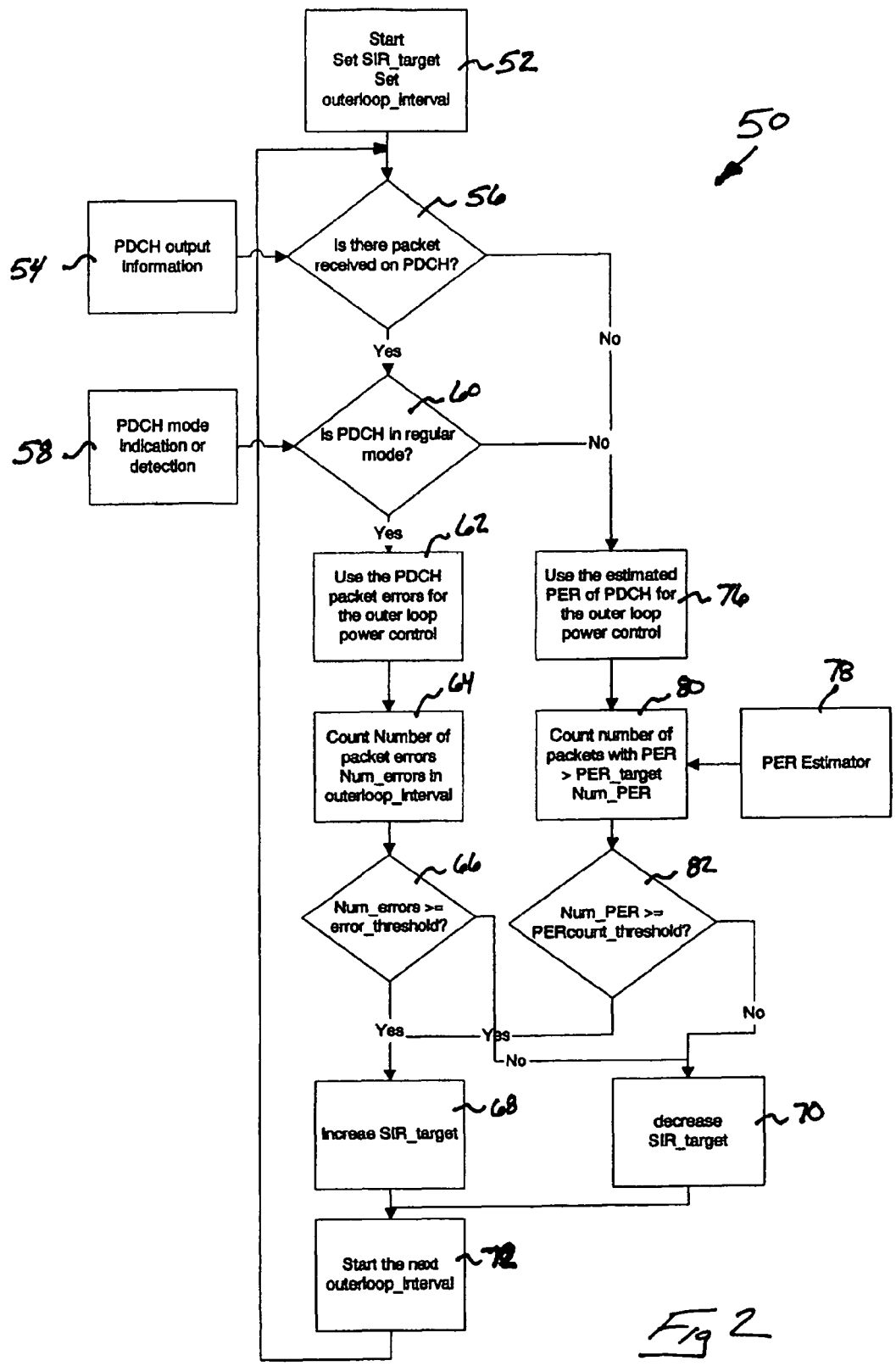
FIG. 2 is a flowchart diagram summarizing one example method of determining an outer loop power control threshold.

FIG. 2 contains a flow chart diagram 50 summarizing one method of using at least one output from another channel for determining an outer loop power control threshold for a traffic channel such as traffic channel used for data transmission. The illustration includes functions performed by the power control portion 22.

The example process begins at 52 where the target SIR is set. The step at 52 also includes setting a desired outer loop control time interval during which to analyze data for purposes of setting the power control threshold. In one example, this time interval is significantly longer than a time slot for each data packet. The time interval will be at least long enough to make a meaningful determination regarding setting an appropriate threshold for use over a useful ensuing time period. Those skilled in the art who have the benefit of this description will realize what constraints will work best to meet the needs of their particular situation.

At 54, the traffic channel PDCH information available from the receiver portion 24, for example, provides an indication of an amount of data transmitted on the traffic channel within a selected time interval. At 56, such information is used to determine whether any data transmissions have occurred and whether the number of received packets is adequate for determining the power control threshold directly from information about the traffic channel PDCH. If there are an adequate number of received packets, the transmission mode information 58, which is obtained from one of the mode detector portions 26 or 28, is analyzed at 60. If the transmission mode is a normal or regular mode, the process continues in a mode of directly considering the traffic channel information for determining the outer loop power control threshold (i.e., setting the SIR threshold).

At 62, the power control portion 22 determines whether there are any packet errors. At 64, the power control portion 22 determines a number of packet errors on the traffic channel PDCH during the outer loop control time interval set at 52.

An appropriate number of packet errors within the time interval (i.e., a packet error rate (PER)) is selected in a known manner to meet the needs of a particular situation. That appropriate number is considered an error threshold in this example. At 66, the determined number of packet errors is compared to the error threshold.

If the number of packet errors exceeds the error threshold, the power control threshold (i.e., a target SIR) is increased at 68. The amount of such an increase depends on the needs of a particular situation and those skilled in the art who have the benefit of this description will be able to use appropriate increases. If the number of packet errors is less than the error threshold, the power control threshold is decreased in a known manner.

The process repeats beginning at 72 for the next outer loop power control interval.

In the event that the traffic channel condition is such that a direct measurement of a packet error rate on the traffic channel PDCH is not possible or reliable for setting the power control threshold, the power control portion 22 uses another mode of operation. In this example, the power control portion uses at least one selected output of at least one other channel for determining the outer loop power control threshold. For example, when the determination at 56 indicates that there are an inadequate number of received packets for directly counting them to determine a PER, the process proceeds to the step indicated at 76. In one example, at least one packet per control time interval is considered adequate. Those skilled in the art who have the benefit of this description will be able to select an appropriate number of packets to provide a meaning PER count to meet the needs of their particular situation.

Alternatively, when the transmission mode on the traffic channel PDCH is a boost mode or another mode other than the normal mode, the process proceeds to the step at 76 instead of the step at 62.

At 76, the power control portion 22 enters a mode including using an estimated control parameter for the traffic channel that is determined by the estimator portion 40 based on an output of another channel. In one example, the estimator portion 40 uses a PER of the pilot channel PICH to determine an equivalent PER for the traffic channel PDCH. That equivalent or estimated PER is provided at 78.

At 80, the power control portion compares the estimated or equivalent PER with a target number PER to effectively determine how many packets on have errors. If the determined number of packets with errors exceeds a count threshold at 82, the outer loop power control threshold is increased at 68. If the determined number of packets with errors is below the count threshold, the threshold is decreased at 70.

The illustrated example uses at least one of the example modes of setting the power control threshold. Whenever a first traffic channel condition exist, which corresponds to an inability to rely on direct consideration of traffic channel information, the power control portion 22 may use the mode of operation that includes estimating a traffic channel output based upon a corresponding output from another channel such as the pilot channel PICH. In one example, both modes are used simultaneously. In such an example, the estimated PER based on the pilot channel output is used as a check on the reliability of the information obtained directly from the traffic channel PDCH.

At this point it is useful to consider one example way of using an output from another channel other than the traffic channel PDCH for determining an equivalent traffic channel PER.

The decoding error probability of a convolutional code or Turbo code is a function of the specific code rate, coded word length and the channel bit error rate (Pb). The channel bit error rate is a function of the ratio of the bit energy to noise spectrum density (Eb/No) and the modulation scheme. For a specific code of interest and modulation scheme, the decoding error probability Pe can be expressed as a function of the Eb/No $$P_e = f_1(E_b/N_0) \quad (1)$$

for convolutional code, or $$P_e = f_1'(E_b/N_0) \quad (2)$$

for Turbo code.

Or Pe can be expressed as a function of Pb $$P_e = f_2(P_b) \quad (3)$$

for convolutional code, or $$P_e = f_2'(P_b) \quad (4)$$

for Turbo code.

It is practically difficult to analyze and obtain the close form solution of the decoding error probability. Instead, an upper bound typically is used to represent the performance of convolutional codes or Turbo codes. The upper bounds on Pe in AWGN channels have been studied. The description relies upon the well-known upper bounds for AWGN channels and uses extensions to include other time-varying channels and the effect of HARQ.

Wireless fading channel is time varying. Power control intends to track the channel variation and fluctuates the received signal strength around the target SIR. In addition, because of HARQ, the received packet consists of sub-packets that are transmitted at different times. All these factors cause the Eb/No or bit error probability (Pb) of the received packet to vary. The well-known analytical bounds for Pe for AWGN channels are no longer applicable anymore in this scenario.

Therefore, extensions to the analysis including deriving bounds while considering the varying Eb/No or Pb situations is useful. An equivalent Eb/No in AWGN channels is used in one example. Assume that for a specific code word and modulation scheme, Pe is a function of the varying Eb/No or Pb, which is represented by a L-dimension vector, $$P_e = g_1(\overline{(E_b/N_0)}) \quad (5)$$

or $$P_e = g_2(\overline{P_b}) \quad (6)$$

For AWGN channels, Pe is represented by equation (1) or (2). The equivalent Eb/No or Pb is defined as $$P_e = f_1((E_b/N_0)_{equ}) = g_1(\overline{(E_b/N_0)}) \quad (7)$$
$$(E_b/N_0)_{equ} @ f_1^{-1}(g_1(\overline{(E_b/N_0)}))$$

$$P_e = f_2((P_b)_{equ}) = g_2(\overline{P_b}) \quad (8)$$
or
$$(P_b)_{equ} @ f_2^{-1}(g_2(\overline{P_b}))$$

In other words, the equivalent Eb/No (or Pb) is an equivalent constant value in AWGN channels that generates the same Pe as the one with the varying Eb/No (or Pb) values. This transforms the analysis of Pe for varying Eb/No (or Pb) to the task of finding the equivalent Eb/No or Pb.

Since the analysis for convolutional codes and Turbo codes are different, it is useful to separately consider the functions for calculating the Pe for the two types of codes accordingly.

For convolutional codes, the functions for calculating the equivalent Pb or Eb/No are noted as:

$$(E_b/N_0)_{equ\_cov} = h_1(\overline{E_b/N_0}) \quad (9)$$

or $$(P_b)_{equ\_cov} = h_2(\overline{P_b}) \quad (10)$$

For Turbo codes, the functions for calculating the equivalent Eb/No or Pb are noted as:

$$(E_b/N_0)_{equ\_turbo} = h_1'(\overline{E_b/N_0}) \quad (11)$$

or $$(P_b)equ_{\_turbo} = h_2'(\overline{P_b}) \quad (12)$$

Figure 3:
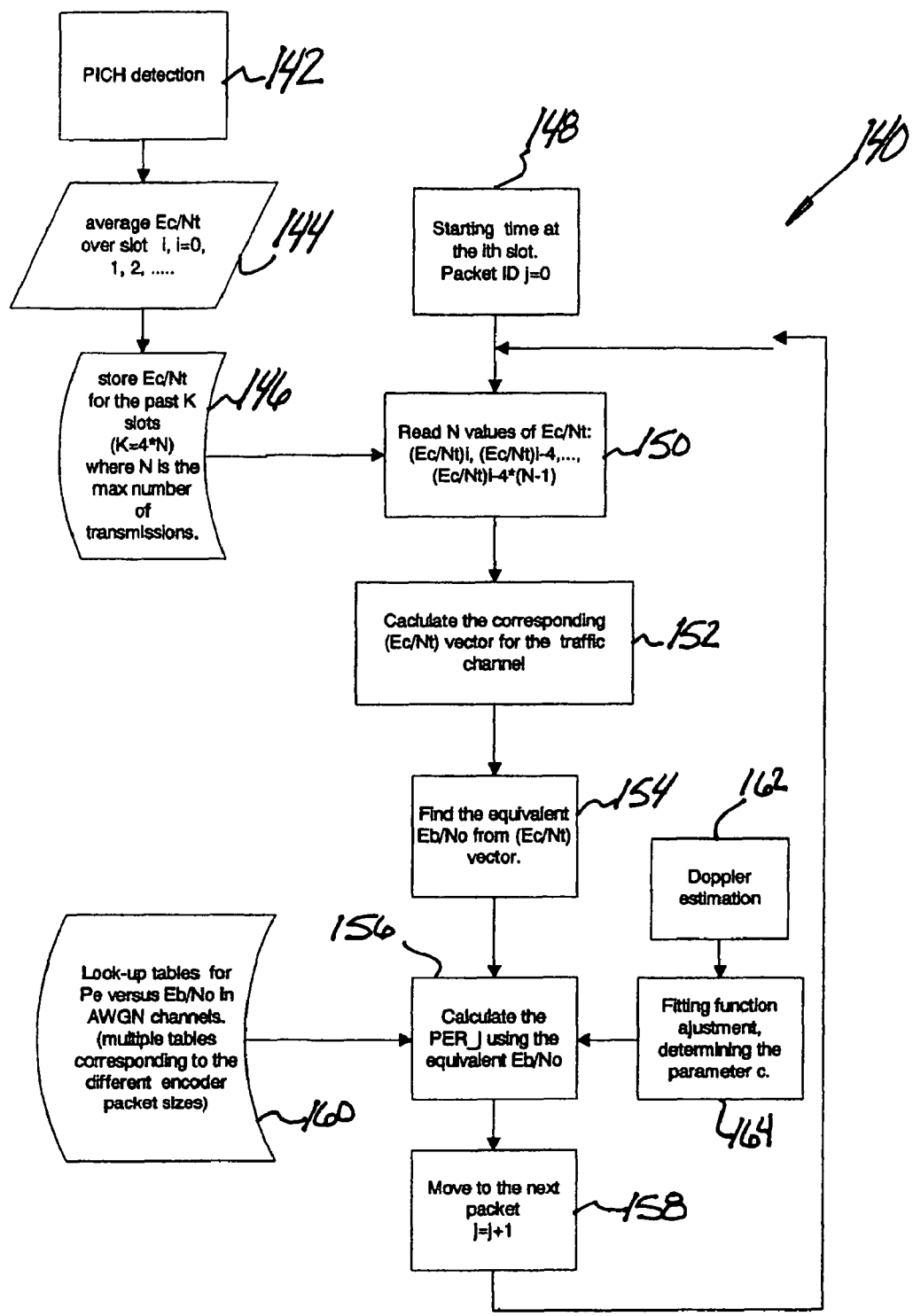
FIG. 3 is a flowchart diagram showing one example method of estimating a traffic channel packet error rate.

In one example, a relationship between the received pilot symbols and the PER of the traffic channel is determined based upon a pilot channel ratio of an energy-per-chip to a noise spectrum density. Referring to FIG. 3, a flow chart 140 summarizes this example approach. The pilot channel sequence is detected at 142. An average energy-per-chip to noise spectrum density ratio (Ec/Nt) over a slot duration can be discerned from the pilot channel using known techniques. In this example, the average Ec/Nt is the selected pilot channel output that provides the basis for an estimate of the traffic channel PER.

The average Ec/Nt over a slot index i is determined at 144. At 146, the average Ec/Nt for K slots is stored, where K=4*N and N is the maximum number of transmissions allowed for a packet. One example includes using HARQ and N is the number of retransmissions of a packet.

Estimating the traffic channel PER begins at an ith slot at 148 where a packet ID j=0, where j represents the received sequence number of the packets. In an example having retransmission, the inter-arrival time of each packet is not a constant. At 150, the estimator portion 40 reads N values of Ec/Nt. At 152, the N values of Ec/Nt are translated to a corresponding Ec/Nt on the traffic channel. In one example, the ratio of the Walsh code spreading factor for the pilot channel (PICH) and the Walsh code spreading factor for the reverse link of the traffic or packet data channel (R-PDCH) is W. The translation at 152 in FIG. 3 can be accomplished using the following equation:

$$(E_c/N_t)^{PDCH} = W(E_c/N_t)^{PICH} \quad (13)$$

In one example there are a maximum number N transmissions per encoder packet. An encoder packet will be declared in error after the maximum number of transmissions is reached. A coded packet in one example consists of N subpackets. The step 152 in FIG. 3 in this example includes forming a vector expression of Ec/Nt with a dimension N, where each element (Ec/Nt)n represents the Ec/Nt of the $n^{th}$ sub-packet. Assuming that at the ith slot, the maximum number of transmissions of a particular packet would have been reached the N values of the vector Ec/Nt of the packet can be expressed as:

$$(E_c/N_t)_n^{PDCH} = W(E_c/N_t)_{i-(N-n-1)*4}^{PICH}, n=0,K,N-1 \quad (14)$$

The term (N-n-1) is multiplied by four in this example because the retransmission of a sub-packet is four slots later from the most recent sub-packet transmission Next, at 154, an equivalent Eb/No on the traffic channel is determined from the Ec/Nt vector. In an example where convolutional code is used, Equation (9) provides the equivalent Eb/No. In an example where turbo code is used, Equation (11) provides the equivalent Eb/No.

The equivalent Eb/No then is used as an input parameter to Equation (1) in examples using convolutional codes. For examples including turbo codes, the equivalent Eb/No is the input parameter to Equation (2) above. In either case, the result is calculating the Pe for the $j^{th}$ packet on the traffic channel. This occurs at 156 in FIG. 3. The estimated PER of the traffic channel then results from completing the calculations described above.

In the example of FIG. 3, the next step at 158 is to increment the value of j and to again repeat the process.

Also in the example of FIG. 3, the calculations at 156 includes using a look up table 160 that provides relationships between Pe and Eb/No in AWGN channels for the different encoder packet sizes. The calculation at 156 also includes using a known Doppler estimation technique at 162. That estimation in this example is used to determine an appropriate fitting function adjustment for the estimated PER at 164.

In one example, the fitting function is determined from an empirical analysis comparing a directly measured PER over a given time period with an estimated PER using the just-described algorithm over the same time period. The fitting function is then useful for subsequent adjustments, if any are necessary, to have the estimated PER correspond as closely as desired to the directly measured PER. In one example, the fitting function is denoted as F(.), which is different based on the code type. In such an example the Pe can be expressed as:

$$P_e = F(f(E_b/N_0), c) \quad (15)$$

where c is a constant and can be tunable for different scenarios. The c can be adjusted based on the channel state information such as the Doppler frequency, path diversity, etc. Given this description, those skilled in the art will be able to select an appropriate fitting function to meet the needs of their particular situation.

The example embodiment provides the advantages of increased system capacity, better link quality and improved system stability. Using an output from another channel other than the traffic channel PDCH to determine an outer loop power control threshold enhances the system performance by providing more consistently reliable power settings under a wider variety of traffic channel conditions.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating, comprising:
   using information regarding a communication received by a receiver for
   determining an outer loop power control threshold for a traffic channel from at least one selected output of at least one other channel when there is a selected traffic channel condition;
   determining when the selected traffic channel condition exists by determining a transmission mode on the traffic channel; and
   determining the transmission mode by
   (i) determining a time between arrivals of sequentially received data packets; and
   (ii) determining a number of transmissions of each packet from the determined times.

2. The method of claim 1, wherein the other channel comprises a pilot channel associated with the traffic channel.

3. The method of claim 2, comprising determining a packet error rate for the traffic channel based upon the selected output of the pilot channel.

4. The method of claim 1, wherein the selected traffic condition comprises a transmission mode on the traffic channel that is one of a boost mode or another mode other than a normal transmission mode.

5. The method of claim 4, comprising determining the outer loop power control threshold for the traffic channel from at least one selected output of the traffic channel when there is another, different traffic channel condition.

6. The method of claim 5, wherein the selected output of the traffic channel is a packet error rate.

7. The method of claim 5, wherein the other, different traffic channel condition comprises an amount of data transmission being above the selected amount and the transmission mode on the traffic channel being the normal transmission mode.

8. The method of claim 1, comprising determining the outer loop power control threshold for the traffic channel from at least one selected output of the traffic channel when there is another, different traffic channel condition.

9. The method of claim 1, comprising determining the transmission mode by decoding received data on the traffic channel.

10. The method of claim 1, comprising
    determining that the transmission mode is a normal transmission mode when the determined number of transmissions is near a maximum; and
    determining that the transmission mode is a boost mode when the number of transmissions is approximately one.

11. The method of claim 10, wherein the selected traffic channel condition exists when the transmission mode is the boost mode.

12. The method of claim 1, comprising determining when the selected traffic channel condition exists by determining an amount of data transmission on the traffic channel during a selected time interval.

13. A method of communicating, comprising:
    using information regarding a communication received by a receiver for
    determining an outer loop power control threshold for a traffic channel directly from at least one output of the traffic channel when a first traffic channel condition exists corresponding to a normal transmission mode on the traffic channel; and
    determining the outer loop power control threshold for the traffic channel from at least one output of at least one other channel when a second, different traffic channel condition exists corresponding to a boost mode that includes a higher transmit power relative to a transmit power of the normal transmission mode.

14. The method of claim 13, wherein the second traffic condition comprises at least one of
    an amount of data transmission on the traffic channel being below a selected amount or
    a transmission mode on the traffic channel being another mode other than the normal transmission mode.

15. The method of claim 14, wherein the first traffic condition comprises an amount of data transmission being above the selected amount and the transmission mode on the traffic channel being the normal transmission mode.

16. The method of claim 13, wherein the other channel is a pilot channel associated with the traffic channel and the selected output is a packet error rate of the pilot channel.

17. The method of claim 16, comprising
    determining a number of transmissions per packet; and
    determining that the transmission mode is the boost mode when the number of transmissions per packet is approximately one.

18. The method of claim 13, comprising
    determining whether the first or second traffic channel condition exists by
    determining a time between arrival of sequentially received packets; and
    determining an average number of transmissions of each packet based upon the determined time.

19. A method of communicating, comprising:
    using information regarding a communication received by a receiver for determining an outer loop power control threshold for a traffic channel directly from at least one output of the traffic channel if a first traffic channel condition exists corresponding to a normal transmission mode on the traffic channel; or determining the outer loop power control threshold for the traffic channel from at least one output of at least one other channel if a second, different traffic channel condition exists corresponding to a boost mode that includes a higher transmit power relative to a transmit power of the normal transmission mode; and determining whether the first or second traffic channel condition exists by determining a time between arrival of sequentially received packets; and determining an average number of transmissions of each packet based upon the determined time.

* * * * *